US012437069B2

(12) United States Patent
Arakawa et al.

(10) Patent No.: US 12,437,069 B2
(45) Date of Patent: Oct. 7, 2025

(54) INFORMATION PROCESSING DEVICE, INFORMATION PROCESSING METHOD AND INFORMATION PROCESSING PROGRAM FOR EXTRACTING A STATIC FILE FROM A FILE GROUP ON THE BASIS OF A LEARNING MODEL

(71) Applicant: NTT, INC., Tokyo (JP)

(72) Inventors: Reika Arakawa, Musashino (JP); Yuki Yamanaka, Musashino (JP); Seishi Ouchi, Musashino (JP); Manami Ito, Musashino (JP); Nobuhiro Chiba, Musashino (JP); Hiroyoshi Takiguchi, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/273,978

(22) PCT Filed: Feb. 12, 2021

(86) PCT No.: PCT/JP2021/005370
§ 371 (c)(1),
(2) Date: Jul. 25, 2023

(87) PCT Pub. No.: WO2022/172422
PCT Pub. Date: Aug. 18, 2022

(65) Prior Publication Data
US 2024/0411879 A1    Dec. 12, 2024

(51) Int. Cl.
*G06F 21/56* (2013.01)
*G06F 21/64* (2013.01)
*G06N 20/00* (2019.01)

(52) U.S. Cl.
CPC .......... *G06F 21/565* (2013.01); *G06F 21/64* (2013.01); *G06F 2221/033* (2013.01); *G06N 20/00* (2019.01)

(58) Field of Classification Search
CPC .. G06F 21/565; G06F 21/64; G06F 2221/033; G06N 20/00
See application file for complete search history.

(56) References Cited

U.S. PATENT DOCUMENTS

2004/0220975 A1* 11/2004 Carpentier ............. G06F 21/64
2016/0366158 A1* 12/2016 Feng .................... H04L 63/145
(Continued)

FOREIGN PATENT DOCUMENTS

| CN | 109960729 A | 7/2019 |
| JP | 2019-008377 A | 1/2019 |
| JP | 2020-071560 A | 5/2020 |

OTHER PUBLICATIONS

Carreras, Robert. "MLFAT: A Machine Learning File Archival Tool". California State University. 2012. (Year: 2012).*

*Primary Examiner* — Robert B Leung
(74) *Attorney, Agent, or Firm* — XSENSUS LLP (57) ABSTRACT

An information processing device having a memory and a processor. The processor is coupled to the memory and programmed to execute a process including learning each feature of a dynamic file and a static file to generate a learning model; acquiring a predetermined file group at a reference point of time from an external device that uses the predetermined file group; and extracting a determination target file, which is the static file, from the predetermined file group on the basis of the learning model.

14 Claims, 7 Drawing Sheets

(56) References Cited

U.S. PATENT DOCUMENTS

| | | | |
|---|---|---|---|
| 2017/0147543 A1* | 5/2017 | Ben-Harrush | G06F 16/957 |
| 2018/0063169 A1* | 3/2018 | Zhao | H04L 63/1416 |
| 2020/0274895 A1* | 8/2020 | Kulaga | G06F 16/906 |
| 2022/0012230 A1 | 1/2022 | Miyamoto et al. | |
| 2022/0188698 A1* | 6/2022 | Halecky | G06Q 30/0613 |

* cited by examiner

| TEACHER DATA SET | VERIFICATION DATA | | |
|---|---|---|---|
| | centOS | Ubuntu | Windows |
| centOS | 0.95544090056 | 0.8769002414 | 0.4733391608 |
| centOS+Ubuntu | 0.98076923076 | 0.9838194036 | 0.6189539627 |
| centOS+Ubuntu+Windows | 0.97232645403 | 0.9776375024 | 0.9152826340 |

INFORMATION PROCESSING DEVICE, INFORMATION PROCESSING METHOD AND INFORMATION PROCESSING PROGRAM FOR EXTRACTING A STATIC FILE FROM A FILE GROUP ON THE BASIS OF A LEARNING MODEL

CROSS-REFERENCE TO RELATED APPLICATION

The present application is based on PCT filing PCT/JP2021/005370, filed Feb. 12, 2021, the entire contents of which are incorporated herein by reference.

TECHNICAL FIELD

The present invention relates to an information processing device, an information processing method, and an information processing program.

BACKGROUND ART

In recent years, society is undergoing a major transformation with the advent of various innovative technologies. While such major transformation is expected to bring about a more convenient and affluent society, there are concerns about the expansion of damage caused by cyber attacks and the bloated risk of social losses that could not have occurred before.

For example, rapid digitization increases security threats such as cyber attacks on control systems in factories, plants, and the like, which are not directly connected to the Internet, and important infrastructures which provide services indispensable for life and social activities.

In the area of the important infrastructures, it is not uncommon to find infrastructure facilities such as several thousand server devices and several tens of thousands to several hundreds of thousands of control devices, and a successful cyber attack at any one location could have far-reaching effects. In view of the reliability of each device constituting the system, a software authenticity determination technique for stably operating the system for always confirming the mixing or alteration of an unauthorized device and preventing abnormal operation is important.

A hash value of a file is often used for software authenticity determination. The hash value is a sequence having compact bit length data generated from the original data, and is generated from the original data by a hash function having unidirectional property. The hash value generated by the hash function is a unique value generated from the original data, and it is guaranteed that the hash value is the same data when the hash value is the same.

For example, in software authenticity determination using the hash value of a file, the hash value obtained at the time when no falsification has occurred is stored as a correct value in a normal state. Then, an authenticity determination program is periodically executed on a file to be determined in the device, and software authenticity determination using the stored correct answer value is performed. In the software authenticity determination, a hash value is calculated from the file to be determined, and compared with the correct value, to detect unauthorized falsification to the file to be determined. However, for a file in which content information is periodically updated or a file in which writing occurs due to an event such as execution of a program, a fixed hash value is not calculated. Therefore, in the authenticity determination method using the comparison of hash values, the inclusion of these files in the determination target files causes erroneous detection. Therefore, in the authenticity determination using the hash value comparison, it is assumed that the file to be determined is a file whose file content does not change, that is, a static file.

In light of the above, when using file hash values to determine software authenticity, it is required to select a static file which does not cause any change to be determined. As a conventional method of selecting a static file, a method of static analysis, dynamic analysis, and selection using a snapshot has been used.

The static analysis is a method for excluding a file to be changed by referring to meta information given to the file. With respect to a specific software package file, meta information given by a developer of the package is referred to for each file, a file having a tag in which overwriting occurs, that is, a dynamic file in which rewriting occurs is excluded, and the remaining file is selected as a static file. In this selection method, the selectable file is a file in which meta information is defined.

The dynamic analysis is a method for monitoring a system call for a certain period of time and extracting an unchanged file as a static file. For a file in which meta information is not defined as in static analysis, the behavior of the file by the system call is monitored by providing a fixed monitoring time, and the remaining file excluding the changed file during the monitoring time is selected as the static file. In this system, if the monitoring time is sufficiently long, the accuracy is improved, but there is a possibility that files which do not change accidentally during the monitoring time or files with a long cycle of change may be included in the actual operation time width.

The selection using a snapshot is a method for monitoring the behavior of the file in the same manner as the dynamic analysis, and the snapshot of the file is acquired twice at fixed intervals, and the difference is analyzed to select the file having no change as a static file. In this method, similar to the dynamic analysis, there is a possibility that a file which has not occurred accidentally or a file with a long cycle of change may be included within the monitoring time.

As a conventional technique for monitoring falsification, the following techniques exist. For example, there has been proposed a technique for generating a combination of static file paths and data, dynamic file paths, and directory paths that satisfy the conditions for storing files on the basis of a list of files used for collation and a determination condition of elements of the list (PTL 1). Also, there has been proposed a technique for comparing common definition information with a file to be managed, determining whether or not there is a file that satisfies all conditions of the common definition information, and extracting the common definition information corresponding to the file to be managed (PTL 2).

CITATION LIST

Patent Literature

[PTL 1] Japanese Patent Application Laid-open No. 2019-8377

[PTL 2] Japanese Patent Application Publication No. 2020-71560

SUMMARY OF INVENTION

Technical Problem

However, in the static analysis method, the target to be determined is limited to a file in which the meta information is defined, and there is a possibility that the target range of software authenticity determination is narrowed and the accuracy is lowered. The dynamic analysis or the selection method using a snapshot is based on the time axis, and there is a possibility that a file which has not changed accidentally is included within the monitored time. Therefore, there is a possibility that a file which is not originally a target of software authenticity determination becomes a target, and accuracy of software authenticity determination may become deteriorated.

Furthermore, in the prior art for determining a path of a static file based on a list of files used for collation and the determination conditions of the elements of the list, the file registered in the predetermined collation information is targeted, and the same problem as the static analysis occurs. In addition, the conventional technique for extracting a desired common definition by comparing the common definition information with a file to be managed also uses predetermined common definition information, so that a problem similar to the static analysis occurs.

In view of the aforementioned circumstances, an object of the present invention is to improve the accuracy of software authenticity determination and ensure stable operation of the system.

Solution to Problem

In order to solve the problems described above and achieve the object, a learning unit learns each feature of a dynamic file and a static file to generate a learning model. An extraction unit acquires a predetermined file group at a reference point of time from an external device using the predetermined file group, and extracts a determination target file, which is the static file, from the predetermined file group on the basis of the learning model.

Advantageous Effects of Invention

According to the present invention, the accuracy of software authenticity determination can be improved and the system can be stably operated.

DESCRIPTION OF EMBODIMENTS

An embodiment of an information processing device, an information processing method, and an information processing program disclosed in the present application will be described below in detail, with reference to the drawings. It should be noted that the following embodiment does not limit the information processing device, the information processing method, and the information processing program disclosed in the present application.

Embodiment

[Authenticity Determination System]

Figure 1:
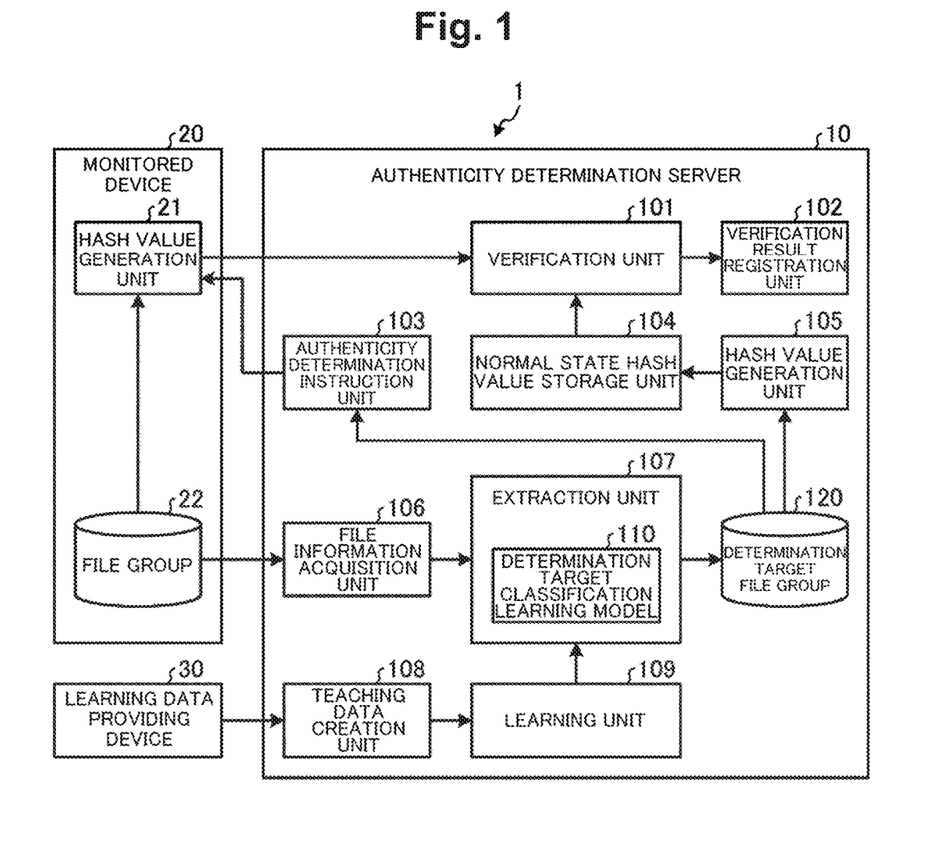
FIG. 1 is a block diagram of an authenticity determination system according to an embodiment.

FIG. 1 is a block diagram of an authenticity determination system according to an embodiment. As shown in FIG. 1, an authenticity determination system 1 according to the present embodiment includes an authenticity determination server 10 which is an information processing device, a monitored device 20 which is an external device for the authenticity determination server 10, and a learning data providing device 30. The authenticity determination server 10, the monitored device 20, and the learning data providing device 30 are connected via a network.

The monitored device 20 is, for example, a control device arranged in an infrastructure system or a server device for providing infrastructure services. The monitored device 20 is a server which may be exposed to a threat of unauthorized software falsification, and as the target of software authenticity detection monitoring, the monitored device 20 is required to avoid difficult recovery situations through prompt detection and handling of unauthorized falsification. The monitored device 20 includes a hash value generation unit 21 and a file group 22.

The file group 22 is a data group used for operating the monitored device 20, and includes both a static file and a dynamic file. File data included in the file group 22 may be subject to unauthorized falsification. That is, the file data included in the file group 22 becomes a determination target of software authenticity determination by the authenticity determination server 10.

The hash value generation unit 21 receives a transmission request requesting for a hash value of each piece of file data included in the file group 22 of the monitored device 20 in operation, from the authenticity determination server 10. Here, the hash value generation unit 21 has a hash function common to a hash function of the authenticity determination server 10. Then, the hash value generation unit 21 calculates a hash value of each piece of file data included in the file group 22. Thereafter, the hash value generation unit 21 outputs the calculated hash value of each piece of file data included in the file group 22, to the authenticity determination server 10.

The learning data providing device 30 is a computer for providing file data used for learning by the authenticity determination server 10. The learning data providing device 30 provides the authenticity determination server 10 with file data used for learning a learning model of software authenticity determination designated from the authenticity determination server 10. The learning data providing device 30 stores files of various OSs (Operating System). For example, the learning data providing device 30 has a plurality of virtual servers for holding system files of different OSs.

[Authenticity Determination Server]

Next, the authenticity determination device 10 will be described next. As shown in FIG. 1, the authenticity determination server 10 includes a verification unit 101, a verification result registration unit 102, an authenticity determination instruction unit 103, a normal state hash value storage unit 104, a hash value generation unit 105, a file information acquisition unit 106, an extraction unit 107, a teacher data creation unit 108, and a learning unit 109.

The teacher data creation unit 108 and the learning unit 109 perform processing for generating a determination target classification learning model 110 to be used when performing software authenticity determination on file data held by the monitored device 20. That is, the teacher data creation unit 108 and the learning unit 109 perform processing in the learning phase of the determination target classification learning model 110.

The teacher data creation unit 108 acquires file data to be used for learning, from the learning data providing device 30. For example, the teacher data creation unit 108 acquires file data of a static file and file data of a dynamic file designated by an administrator, from a learning data providing device 30.

A method of selecting file data used for learning will be described below. For example, in the present embodiment, any one of the following three types or a combination thereof is used as a selection target of file data to be used for learning, based on the OS domain type. The first is a 64-bit version of centOS8™, an OS used in Linux™ distribution. The second is a 64-bit version of Ubutu20.04™, also an OS used in Linux distribution. The third is a 64-bit version Windows 10™. In the following description, these are simply referred to as "centOS," "Ubuntu" and "Windows.".

Further, data capable of specifying whether the file data is a static file or a dynamic file is selected among the file data of the respective OSs described above. In the present embodiment, it is determined whether certain file data is a static file or a dynamic file, based on the following criteria.

For example, it is determined whether the file data to be used for learning collected from the centOS and the Ubuntu is a static file or a dynamic file by referring to the file system hierarchy standard of Linux. More specifically, the file data existing under the control of a specific directory for storing an invariable file such as a static setting file and a read-only file is regarded as a static file. For example, files under the control of /etc/, /boot, /user/bin are considered static files. File data existing under a specific directory for storing a transient or temporary file such as a file data spool file or a log file is considered as a dynamic file. For example, /var represents the following file data as a dynamic file. For Windows, file data whose update date is older than one year is considered a static file, and file data whose update date is within one year is considered a dynamic file.

In file data used for learning collected from Windows, file data whose update date is older than one year is considered a static file, and file data whose update date is within one year is considered a dynamic file.

In the case of the file data of the centOS and the Ubuntu, the teacher data creation unit 108 receives designation that the file data existing under the control of a specific directory storing an invariant file is a static file. The teacher data creation unit 108 receives designation that the file data existing under the control of a specific directory storing transient or temporary file data is a dynamic file among the file data of the centOS and the Ubuntu. In the case of the file data of Windows, the teacher data creation unit 108 receives designation of a static file for a file whose update date is older than one year and designation of a dynamic file for a file whose update date is within one year. The teacher data creation unit 108 collects the binary of the static file and the dynamic file in the file data group used for learning, from the learning data providing device 30 in accordance with the above designation.

Figure 2:
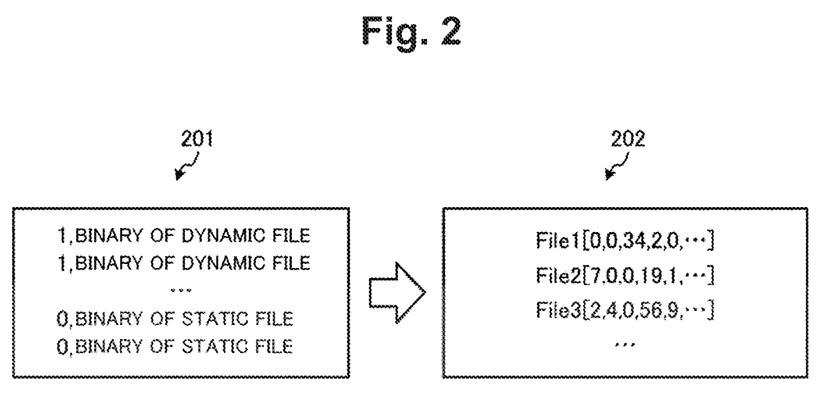
FIG. 2 is a diagram for explaining creation of teacher data.

FIG. 2 is a diagram for explaining creation of teacher data As shown in the collected data 201 in FIG. 2, the teacher data creation unit 108 adds a label "1" to a file which can be regarded as the collected dynamic file, and adds a label "0" to a file which can be regarded as the static file, thereby making a teacher label of each file. Further, the teacher data creation unit 108 creates a feature vector representing the number of appearances of one byte character represented by hexadecimal for each file, to create teacher data 202. The teacher data 202 shown in in FIG. 2 represents a vector in which the number of appearances of hexadecimal numbers from 00 to ff for each file is arranged in order. In the present embodiment, the number of appearances of bytes is used as the feature for each file, and the file size is not taken into consideration. However, the method of calculating the feature is not limited thereto, and the teacher data creation unit 108 may obtain the feature in consideration of other indexes such as file size.

Thereafter, the teacher data creation unit 108 outputs, to the learning unit 109, teacher data which is binary data to which a teacher label indicating whether the file is a static file or a dynamic file is added.

The learning unit 109 receives the input of the teacher data from the teacher data creation unit 108. Then, the learning unit 109 performs learning by using the acquired teacher data, and performs Hyper parameter tuning with the highest classification accuracy, to generate the learned determination target classification learning model 110. That is, the learning unit 109 learns each feature of the dynamic file and the static file to generate the learning model. Here, the determination target classification learning model 110 corresponds to an example of the learning model. More specifically, the learning unit 109 learns each feature of the dynamic file and the static file by using the binary data of the static file and the dynamic file. The learning unit 109 also learns by using the learning data of each OS domain type.

More specifically, the learning unit 109 according to the present embodiment performs parameter tuning and cross verification by grid search using a classification algorithm called a support vector machine, and sets a model having the highest classification accuracy as the determination target classification learning model 110. Thereafter, the learning unit 109 outputs the learned determination target classification learning model 110 to the extraction unit 107.

The file information acquisition unit 106 and the extraction unit 107 perform processing for classifying and extracting static files to be used as determination targets when performing software authenticity determination on file data held by the monitored device 20. That is, the file information acquisition unit 106 and the extraction unit 107 perform processing in the classification phase of the determination target classification learning model 110.

The file information acquisition unit 106 acquires, from the file information acquisition unit 106, the file group 22 included in the monitored device 20 at the reference point of time when it is confirmed that the monitored device 20 is in the normal state. Then, the file information acquisition unit 106 outputs the acquired file group 22 to the extraction unit 107.

The extraction unit 107 acquires the file group 22 from the file information acquisition unit 106. Then, the extraction unit 107 inputs the acquired file group 22 to the learned determination target classification learning model 110, and classifies it into a static file and a dynamic file. That is, the extraction unit 107 extracts a determination target file which is a static file, from a predetermined file group on the basis of the learning model. Here, the file group 22 corresponds to an example of the predetermined file, and the determination target classification learning model 110 corresponds to an example of the learning model. More specifically, the extraction unit 107 receives the input of the predetermined file group, classifies the predetermined file group that has been input on the basis of the learning model into a static file or a dynamic file, and extracts the static file.

Thereafter, the extraction unit 107 extracts the static file included in the file group 22, and causes the authenticity determination server 10 to hold the extracted static file as a determination target file group 120. In so doing, the extraction unit 107 adds a list of determination target files representing the extracted static files, to the determination target file group 120.

The hash value generation unit 105 and the normal state hash value storage unit 104 perform processing for securing a hash value of a determination target file in a normal state, as a reference of software authenticity determination. That is, the hash value generating unit 105 and the normal state hash value storage unit 104 perform processing of the normal state hash value storage phase.

The hash value generation unit 105 acquires each determination target file in a normal state included in the determination target file group 120. Next, the hash value generation unit 105 calculates a hash value of each acquired determination target file. That is, the hash value generation unit 105 obtains a first hash value of each of the determination target files extracted by the extraction unit 107. Thereafter, the hash value generation unit 105 stores the hash value of each determination target file in a normal state, in the normal state hash value storage unit 104.

The normal state hash value storage unit 104 acquires and stores the hash value calculated from the determination target file in a normal state at the reference point of time, from the hash value generation unit 105. Hereinafter, the hash value calculated from the determination target file in a normal state is called "normal state hash value."

The authenticity determination instruction unit 103, the verification unit 101, and the verification result registration unit 102 perform software authenticity determination processing of the file group 22 included in the monitored device 20 at the time of operation. That is, the authenticity determination instruction unit 103, the verification unit 101, and the verification result registration unit 102 perform processing of the authenticity determination phase.

The authenticity determination instruction unit 103 acquires identification information of each determination target file from the determination target file list added to the determination target file group 120. Then, the authenticity determination instruction unit 103 transmits a hash value calculation request to the hash value generation unit 21 of the monitored device 20 together with identification information of each determination target file. The authenticity determination instruction unit 103 repeats the above-mentioned processing for starting the software authenticity determination periodically, such as once a day.

The verification unit 101 receives the hash value of the file group 22 included in the monitored device 20 in operation, from the hash value generation unit 21 of the monitored device 20. The file group 22 included in the monitored device 20 in operation is the file group 22 obtained after a lapse of time from the reference point of time, and is the file group 22 having a possibility of being falsified. In the following description, the hash value of the file group 22 included in the monitored device 20 in operation is called "hash value having falsification possibility."

The verification unit 101 acquires a normal state hash value of each determination target file from the normal state hash value storage unit 104. Then, the verification unit 101 compares the hash value having falsification possibility of each of the determination target files with the normal state hash value, to determine whether or not the values coincide with each other. Thus, the verification unit 101 determines whether or not the determination target file obtained at the point of time coincides with the determination target file obtained at the reference point of time. The verification unit 101 determines that no falsification has been performed on the determination target file whose values match. On the other hand, the verification unit 101 determines that the falsification has been performed for the determination target file whose values are not coincident. Thereafter, the verification unit 101 outputs, to the verification result registration unit 102, a verification result of falsification of the monitored device 20 that indicates whether falsification has been performed on the file group 22 of the monitored device 20 or not.

As described above, the verification unit 101 acquires, from an external device, a second hash value of each of the determination target files after a lapse of time from the reference point of time that the external device has, compares the first hash value with the second hash value, and verifies whether or not the predetermined file group has been falsified. Here, the monitored device 20 is an example of the external device, the normal state hash value is an example of the first hash value, the hash value having falsification possibility is an example of the second hash value, and the file group 22 is an example of the predetermined file group.

The verification result registration unit 102 receives the input of the verification result of falsification of the monitored device 20 from the verification unit 101. When acquiring the verification result indicating that falsification has been performed, the verification result registration unit 102 registers the verification result indicating that the monitored device 20 has been illegally falsified, in a registration place for the verification result that the authenticity determination server 10 has. The administrator can confirm that illegal falsification has been performed on the monitored device 20, by confirming the registration place for the verification result in the authenticity determination server 10.

Figure 3:
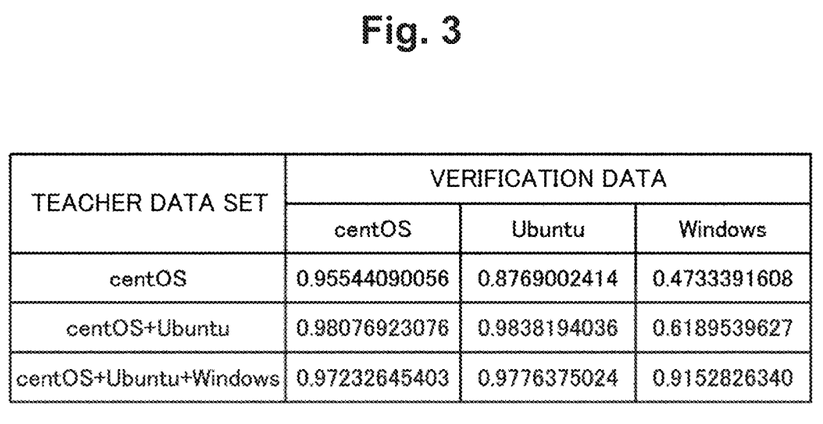
FIG. 3 is a diagram showing an example of a result of classifying falsified files by an authenticity determination server according to an embodiment.

FIG. 3 is a diagram showing an example of a result of classifying falsified files by the authenticity determination server according to an embodiment. Referring to FIG. 3, next is described the result of classification of falsified files by the authenticity determination server 10 according to the present embodiment. Here, three cases of using the file data of the centOS as the teacher data set which is the original data for creating the teacher data, using the file data of the centOS and the Ubuntu, and using the file data of the centOS, the Ubuntu and Windows, will be described as examples.

First, the case where the determination target classification learning model 110 is generated by using the file data of the centOS will be described. When the file data of the centOS is used as the verification data, the value of AUC (Area Under Curve) is 0.9 or more, and the classification can be performed with high accuracy. When the Ubuntu file data is used as the verification data, the value of AUC is 0.8 or more, and the classification can be performed with high accuracy. That is, even in the verification of unlearned Ubuntu file data, classification can be performed with high accuracy, and it can be seen that the same OS domain has generalization performance. On the other hand, when the file data of Windows is used as the verification data, the AUC value is less than 0.5 and the classification accuracy is low.

Second, the case where the determination target classification learning model 110 is generated by using the file data of the centOS and the Ubuntu will be described. When the file data of the centOS is used as the verification data, the value of AUC is 0.9 or more, and the classification can be performed with high accuracy. When the Ubuntu file data is used as the verification data, the value of AUC is 0.9 or more, and the classification can be performed with high accuracy. That is, when the verification data of the same domain type is classified with respect to the teacher data used for learning, classification can be performed with high accuracy. On the other hand, when the file data of Windows is used as the verification data, the AUC is 0.6 or more, and the classification accuracy is somewhat good.

Third, the case in which the determination target classification learning model 110 is generated by using the file data of the centOS, the Ubuntu and the Windows will be described. It can be said that the value of AUC is 0.9 or more and the classification is possible with high accuracy in both cases where the file data of centOS is used as the verification data, the file data of Ubuntu is used as the verification data, and the file data of Windows is used as the verification data. That is, when the verification data of the same domain type is classified with respect to the teacher data used for learning, classification can be performed with high accuracy.

[Processing Procedure of Learning Phase]

Figure 4:
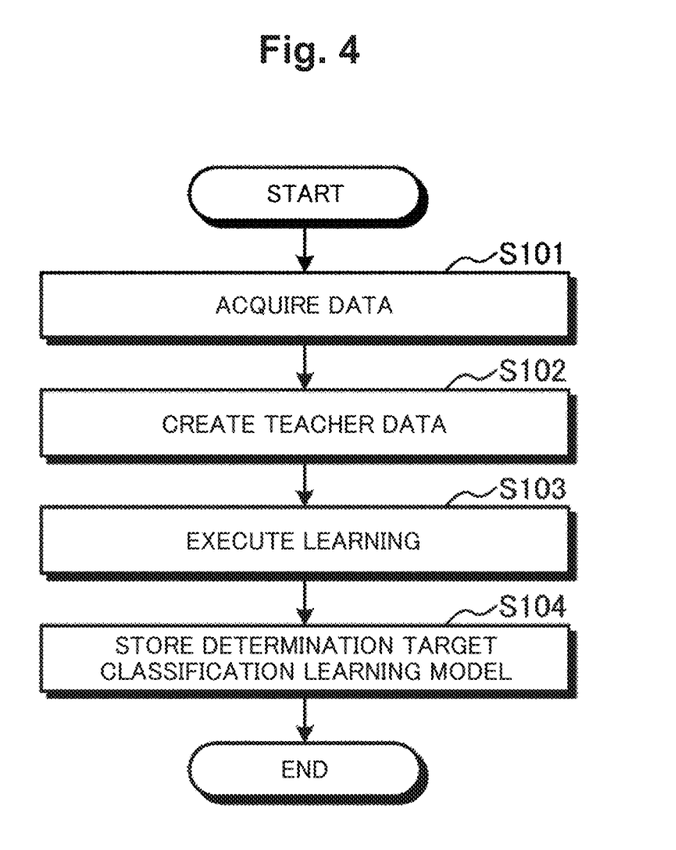
FIG. 4 is a flowchart of processing in a learning phase of the authenticity determination server according to an embodiment.

FIG. 4 is a flowchart of processing in a learning phase of the authenticity determination server according to an embodiment. Next, with reference to FIG. 4, the flow of processing in the learning phase of the authenticity determination server 10 according to the present embodiment will be described.

The teacher data creation unit 108 acquires file data to be used for learning, from the learning data providing device 30. For example, the teacher data creation unit 108 acquires binary data of each of a static file and a dynamic file in a file data group to be used for learning, from the learning data providing device 30, according to an instruction from the administrator (step S101).

The teacher data creation unit 108 adds a label representing a dynamic file or a static file to each file, and creates a feature vector representing the number of appearances of a 1-byte character expressed in hexadecimal for each file, to create teacher data (step S102).

The teacher data creation unit 108 outputs, to the learning unit 109, the teacher data which is binary data to which a teacher label indicating whether the file is a static file or a dynamic file is added. The learning unit 109 uses the teacher data acquired from the teacher data creation unit 108, to perform learning for Hyper parameter tuning with the highest classification accuracy, and generates the learned determination target classification learning model 110 (step S103).

The learning unit 109 outputs the learned determination target classification learning model 110 to the extraction unit 107. The extraction unit 107 stores the determination target classification learning model 110 acquired from the learning unit 109 (step S104).

[Processing Procedure of Learning Phase]

Figure 5:
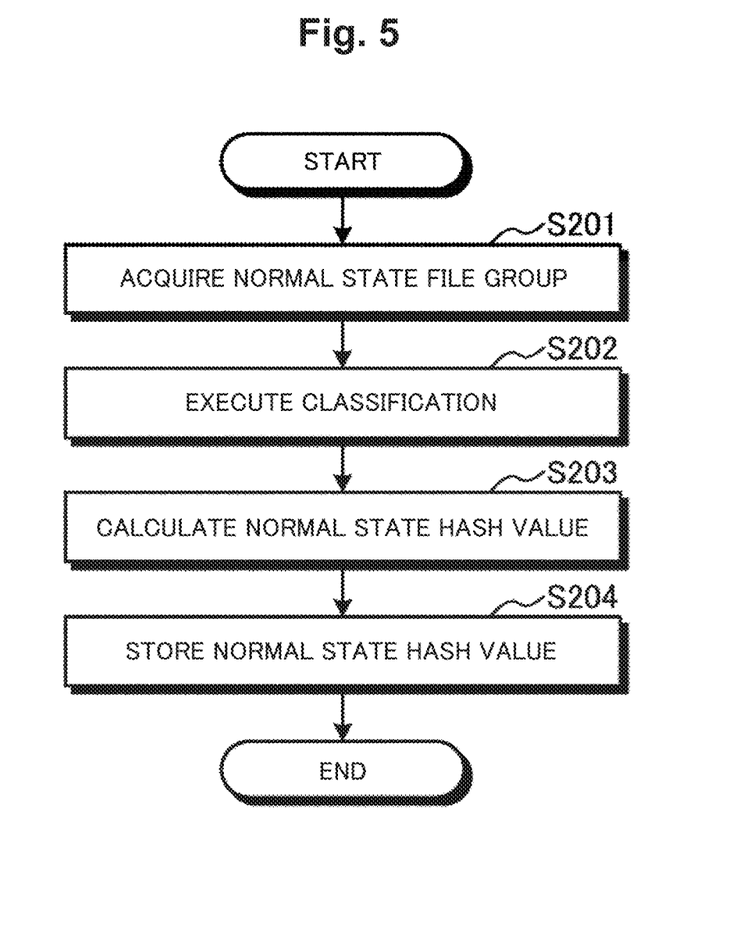
FIG. 5 is a flowchart of processing in a classification phase and a normal state hash value storage phase of the authenticity determination server according to an embodiment.

FIG. 5 is a flowchart of processing in the classification phase and the normal state hash value storage phase of the authenticity determination server according to the embodiment. Next, the flow of processing in the classification phase and the normal state hash value storage phase of the authenticity determination server 10 according to the present embodiment will be described with reference to FIG. 5.

The file information acquisition unit 106 acquires, from the file information acquisition unit 106, the file group 22 of the monitored device 20 at the reference point of time confirmed as the normal state (step S201).

The extraction unit 107 acquires the file group 22 from the file information acquisition unit 106. Then, the extraction unit 107 inputs the acquired file group 22 to the learned determination target classification learning model 110, and classifies it into a static file and a dynamic file (step S202).

The extraction unit 107 extracts the static file included in the file group 22, and causes the authenticity determination server 10 to hold the extracted static file as the determination target file group 120. The hash value generation unit 105 acquires each determination target file in a normal state included in the determination target file group 120. Next, the hash value generation unit 105 calculates a normal state hash value of each acquired determination target file (step S203).

The hash value generation unit 105 stores the hash value of each determination target file in a normal state in the normal state hash value storage unit 104 (step S204).

[Processing Procedure of Learning Phase]

Figure 6:
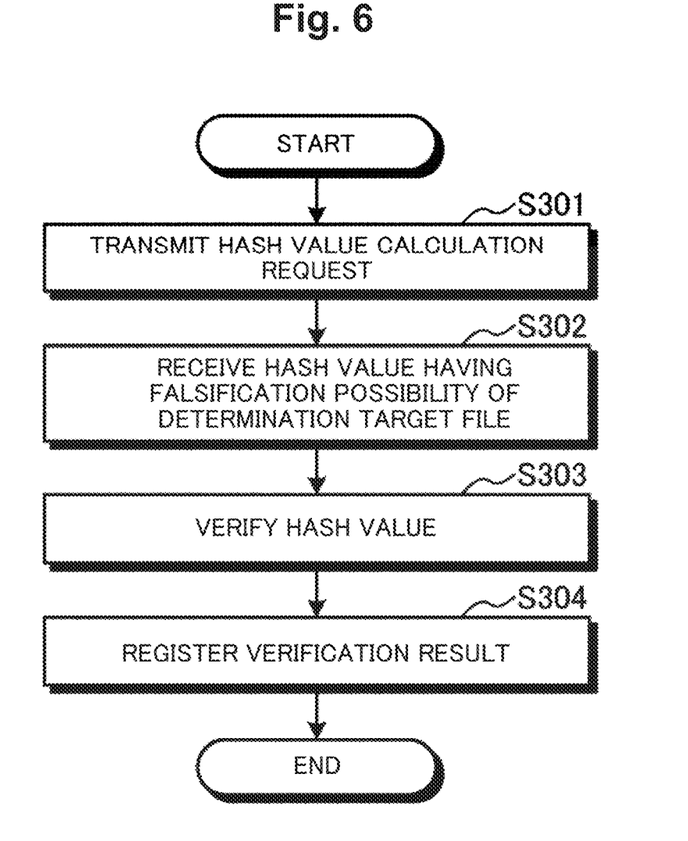
FIG. 6 is a flowchart of procedure in an authenticity determination phase of the authenticity determination server according to an embodiment.

FIG. 6 is a flowchart of processing in the authenticity determination phase of the authenticity determination server according to the embodiment. Next, with reference to FIG. 6, the flow of processing in the authenticity determination phase of the authenticity determination server 10 according to the present embodiment will be described.

The authenticity determination instruction unit 103 acquires identification information of each determination target file from the determination target file list added to the determination target file group 120. Then, the authenticity determination instruction unit 103 transmits a calculation request for a hash value together with identification information of each determination target file, to the hash value generation unit 21 of the monitored device 20 (step S301).

The hash value generation unit 21 of the monitored device 20 acquires each piece of file data of the file group 22 and calculates each hash value having falsification possibility. The verification unit 101 receives the hash value having falsification possibility of the file group 22 of the monitored device 20 in operation, from the hash value generation unit 21 of the monitored device 20 (step S302).

Next, the verification unit 101 acquires a normal state hash value of each determination target file from the normal state hash value storage unit 104. Then, the verification unit 101 compares the hash value having falsification possibility of each of the determination target files with the normal state hash value, and verifies the presence/absence of falsification in each piece of file data (step S303).

The verification result registration unit 102 receives the input of the verification result of falsification of the monitored device 20, from the verification unit 101. When acquiring the verification result indicating that falsification has been performed, the verification result registration unit 102 registers the verification result indicating that the monitored device 20 has been illegally falsified, in a registration place for the verification result in the authenticity determination server 10 (step S304).

[Effects of Processing of Authenticity Determination Server According to Embodiment]

As described above, the authenticity determination server 10 according to the present embodiment extracts a determination target file, which is a static file, from the file group 22 of the monitored device 20 by using the learning model generated by learning the features of the static file and the dynamic file. Then, the authenticity determination server 10 compares a normal state hash value obtained from a determination target file at a reference point of time when it is considered that no falsification is performed, with the hash value having falsification possibility that is obtained from the determination target file of the monitored device 20 in operation, and detects falsification on the monitored device 20.

Thus, the static file can be easily and comprehensively extracted from the file group 22 of the monitored device 20. By performing software authenticity determination using the extracted static file as a determination target file, a wide target range of software authenticity determination can be secured, and a file which is not the target of software authenticity determination can be removed from the determination target files. Therefore, the accuracy of software authenticity determination can be improved, stably operating the system.

[System Configuration Etc.]

The components of the devices illustrated in the drawings are functional concepts and do not necessarily need to be physically configured in the same way as illustrated in the drawings. That is to say, specific forms of distribution and integration of the devices are not limited to those illustrated in the figures, and all or part thereof can be configured being functionally or physically distributed or integrated in optional increments, in accordance with various types of loads, usage states, and so forth. In particular, it is also possible to have a configuration in which the monitored device 20 includes the normal state hash value storage unit 104 and the verification unit 101. When the verification unit 101 is arranged in the monitored device 20, the monitored device 20 transmits a verification result to the authenticity determination server 10, and the authenticity determination server 10 registers the acquired verification result. Further, any or all of the processing functions performed by each device may be implemented by a CPU (Central Processing Unit) and a program analyzed and executed by the CPU, or may be implemented as hardware by wired logic.

Also, out of the processes described in the present embodiment, all or part of processes described as being automatically performed can be manually performed. Alternatively, all or part of processes described as being manually performed can be automatically performed by known methods. In addition, information including the processing procedure, control procedure, specific name, various data and parameters that are shown in the above documents and drawings may be arbitrarily changed unless otherwise described.

[Program]

In one embodiment, the authenticity determination server 10 may be implemented by installing an information processing program that executes the above-described information processing, as packaged software or online software, on a desired computer. For example, by causing an information processing device to execute the above-described information processing program, it is possible to cause the information processing device to function as the authenticity determination server 10. The information processing device described here may not only include a server computer but also include desktop and laptop personal computers. Additionally, mobile communication terminals such as smartphones, cellular telephones, PHSs (Personal Handyphone System), and so forth, and further, slate terminal and the like, such as PDAs (Personal Digital Assistant) and so forth, are included in the scope of information processing devices.

The authenticity determination server 10 can be implemented as a management server device for providing a client, which is a terminal device used by a user, with services related to the above-mentioned management processing. For example, the management server device is implemented as a server device which receives the configuration input request and provides a management service for performing configuration input. In this case, the management server device may be implemented as a Web server, or may be implemented as a cloud for providing a service related to the above-mentioned management processing by outsourcing.

Figure 7:
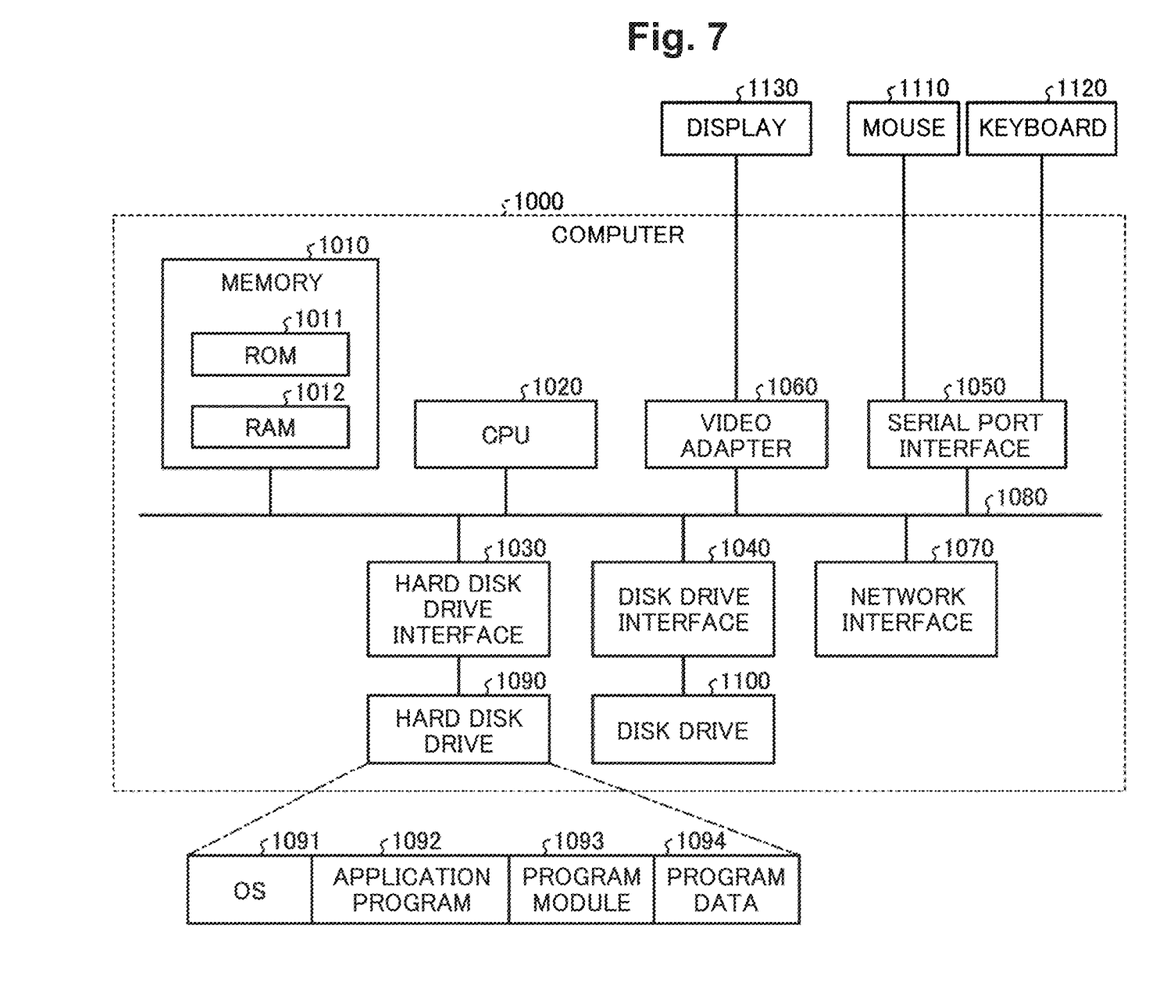
FIG. 7 is a diagram showing an example of a computer that executes a learning program.

FIG. 7 is a diagram showing an example of the computer which executes the learning program. A computer 1000 includes, for example, a memory 1010 and a CPU 1020. The computer 1000 also has a hard disk drive interface 1030, a disc drive interface 1040, a serial port interface 1050, a video adapter 1060, and a network interface 1070. These components are connected to each other via a bus 1080.

The memory 1010 includes a ROM (Read Only Memory) 1011 and a RAM (Random Access Memory) 1012. The ROM 1011 stores a boot program such as a BIOS (BASIC Input Output System) or the like, for example. The hard disk drive interface 1030 is connected to a hard disk drive 1090. The disc drive interface 1040 is connected to a disc drive 1100. For example, a removable storage medium such as a magnetic disk or an optical disk is inserted in the disk drive 1100. The serial port interface 1050 is connected to, for example, a mouse 1110 or a keyboard 1120. The video adapter 1060 is connected to, for example, a display 1130.

The hard disk drive 1090 stores, for example, an OS 1091, an application program 1092, a program module 1093, and program data 1094. In other words, a learning program that defines each processing of the authenticity determination server 10 having the similar function to the authenticity determination server 10 is implemented as the program module 1093 on which computer-executable codes are described. The program module 1093 is stored in, for example, the hard disk drive 1090. For example, the program module 1093 for executing the same processing as the processing performed by the functional element of the authenticity determination server 10 is stored on the hard disk drive 1090. Note that the hard disk drive 1090 may be replaced with a Solid State Drive (SSD).

In addition, the setting data used in the processing in the above embodiment is stored in, for example, the memory 1010 or hard disk drive 1090 as the program data 1094. The CPU 1020 then reads out the program module 1093 and the program data 1094 stored in the memory 1010 or the hard disk drive 1090 to the RAM 1012 as necessary, and executes the processing of the embodiments described above.

Note that in addition to being stored in the hard disk drive 1090, the program module 1093 or program data 1094 may be stored in, for example, a removable storage medium and read out via the disk drive 1100 by the CPU 1020. Alternatively, the program module 1093 and program data 1094 may be stored in other computers connected via a network (LAN (Local Area Network) or WAN (Wide Area Network), etc.). Then, the program module 1093 and program data 1094 may be read out from the other computers via the network interface 1070 by the CPU 1020.

REFERENCE SIGNS LIST

1 Authenticity determination system
10 Authenticity determination server
20 Monitored device 21 Hash value generation unit
22 File group
30 Learning data providing device
101 Verification unit
102 Verification result registration unit
103 Authenticity determination instruction unit
104 Normal state hash value storage unit
105 Hash value generation unit
106 File information acquisition unit
107 Extraction unit
108 Teacher data creation unit
109 Learning unit
110 Determination target classification learning model
120 Determination target file group

The invention claimed is:

1. An information processing device, comprising:
a memory; and
a processor coupled to the memory and programmed to execute a process comprising:
learning each feature of a dynamic file and a static file to generate a learning model;
acquiring a predetermined file group at a reference point of time from an external device that uses the predetermined file group; and
extracting a determination target file, which is the static file, from the predetermined file group on the basis of the learning model,
wherein the learning includes learning using teacher data for a plurality of Operating System (OS) domain types.

2. The information processing device according to claim 1, wherein the learning performs learning of each feature of the dynamic file and the static file by using binary data of the static file and the dynamic file.

3. The information processing device according to claim 1, wherein the learning includes learning using teacher data for each Operating System (OS) domain type.

4. The information processing device according to claim 1, wherein the extracting includes receiving an input of the predetermined file group, classifying the input predetermined file group into the static file or the dynamic file based on the learning model, and extracting the static file.

5. The information processing device according to claim 1, the process further comprising:
calculating a first hash value of the determination target file extracted by the extracting; and
acquiring, from the external device, a second hash value of the determination target file after a lapse of time from the reference point of time that the external device has, comparing the first hash value with the second hash value, and verifying whether or not the predetermined file group has been falsified.

6. The information processing device according to claim 1, wherein the learning includes creating a feature vector representing a number of appearances of one-byte characters expressed in hexadecimal for each of the dynamic file and the static file.

7. The information processing device according to claim 1, wherein the static file includes file data stored under a directory designated for invariable files in a file system hierarchy.

8. The information processing device according to claim 1, wherein the dynamic file includes file data stored under a directory designated for transient or temporary files in a file system hierarchy.

9. The information processing device according to claim 7, wherein the dynamic file includes file data stored under a directory designated for transient or temporary files in the file system hierarchy.

10. The information processing device according to claim 5, wherein the verifying determines that falsification has occurred when the first hash value does not match the second hash value.

11. The information processing device according to claim 5, wherein the verifying determines that no falsification has occurred when the first hash value matches the second hash value.

12. The information processing device according to claim 10, wherein the verifying determines that no falsification has occurred when the first hash value matches the second hash value.

13. An information processing method, comprising the steps of:
generating a learning model by learning each feature of a dynamic file and a static file;
acquiring a predetermined file group at a reference point of time from an external device that uses the predetermined file group; and
extracting a determination target file, which is the static file, from the predetermined file group on the basis of the learning model,
wherein the learning includes learning using teacher data for a plurality of Operating System (OS) domain types.

14. A non-transitory computer-readable recording medium having stored therein an information processing program for causing a computer to execute a process comprising:
generating a learning model by learning each feature of a dynamic file and a static file;
acquiring a predetermined file group at a reference point of time from an external device that uses the predetermined file group; and
extracting a determination target file, which is the static file, from the predetermined file group on the basis of the learning model,
wherein the learning includes learning using teacher data for a plurality of Operating System (OS) domain types.

* * * * *

UNITED STATES PATENT AND TRADEMARK OFFICE
CERTIFICATE OF CORRECTION

Page 1 of 1

PATENT NO. : 12,437,069 B2
APPLICATION NO. : 18/273978
DATED : October 7, 2025
INVENTOR(S) : Reika Arakawa et al.

It is certified that error appears in the above-identified patent and that said Letters Patent is hereby corrected as shown below:

On the Title Page

Item (71) Applicant: the Applicant name should be corrected from "NTT, INC." to --NTT, Inc.--

Signed and Sealed this
Second Day of December, 2025

John A. Squires
*Director of the United States Patent and Trademark Office*